March 25, 1930.　　　　C. C. LUTZ　　　　1,751,590
ATTACHMENT FOR PLANTERS
Filed Jan. 31, 1927　　　3 Sheets-Sheet 1
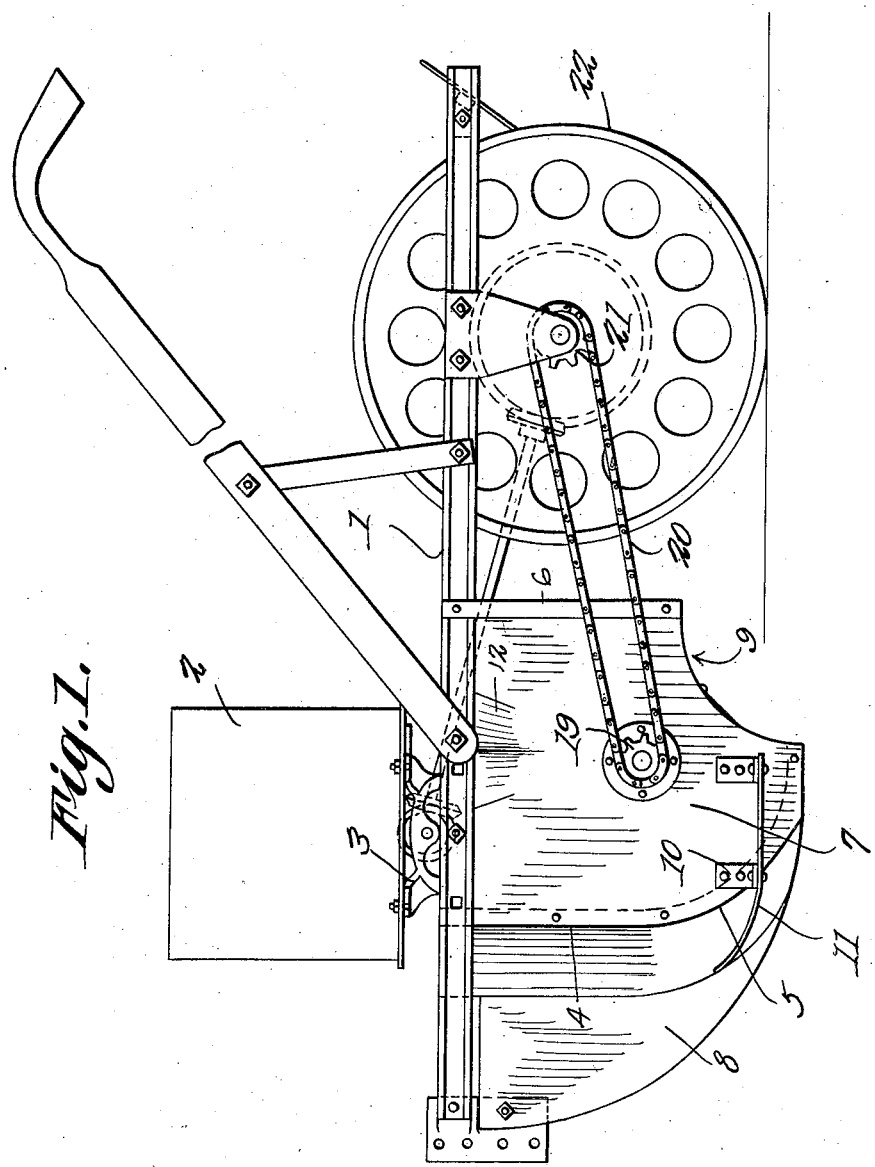
Clovis C. Lutz
Inventor

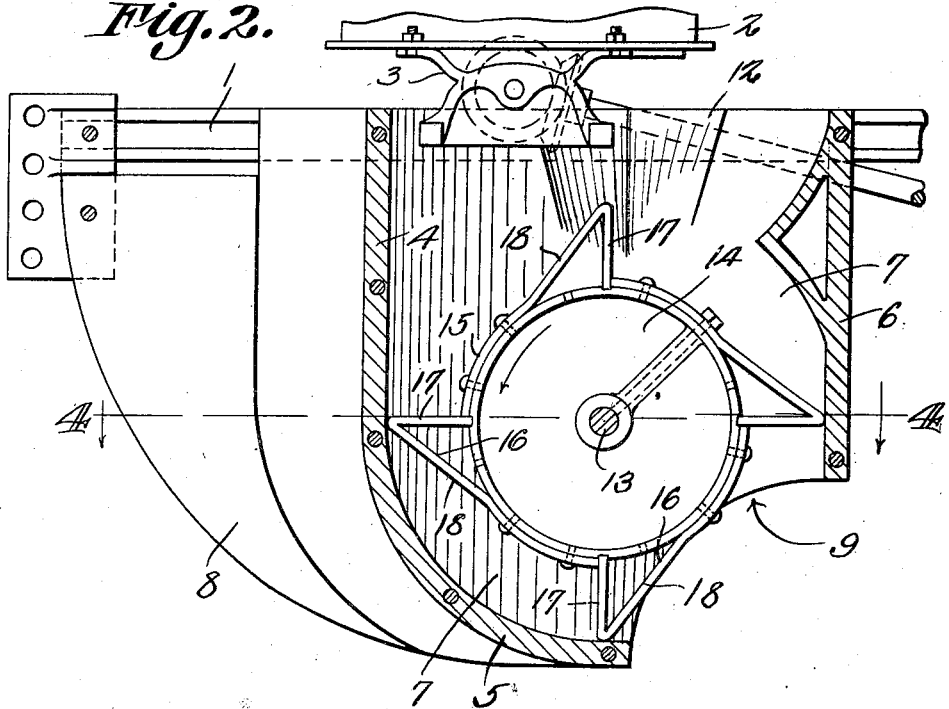
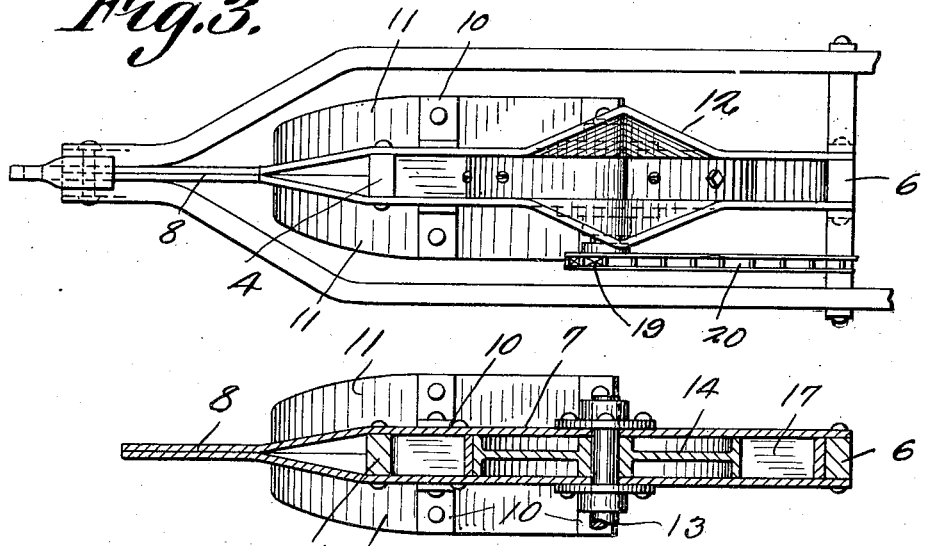

March 25, 1930.   C. C. LUTZ   1,751,590
ATTACHMENT FOR PLANTERS
Filed Jan. 31, 1927   3 Sheets-Sheet 3
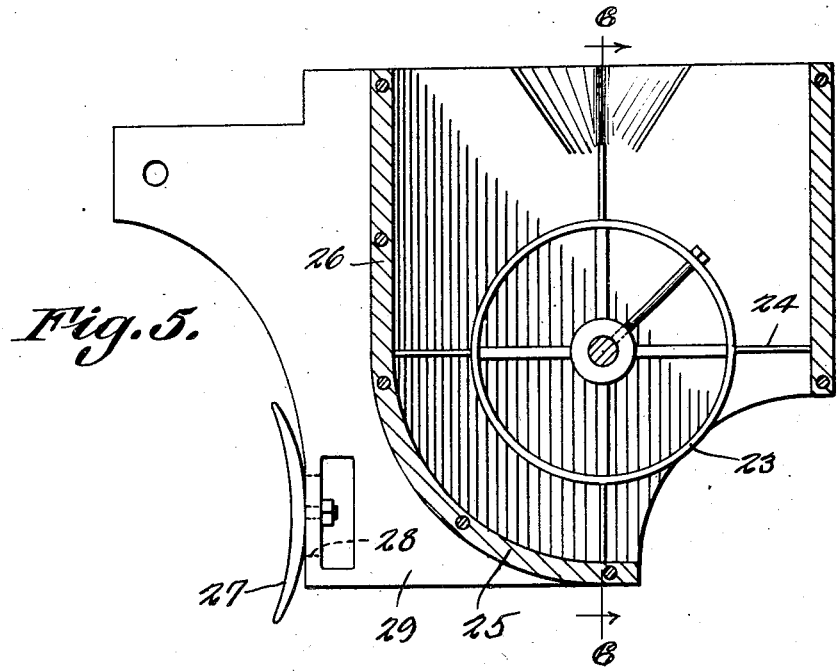
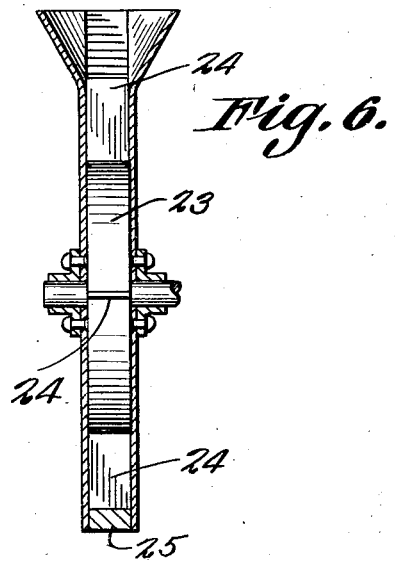
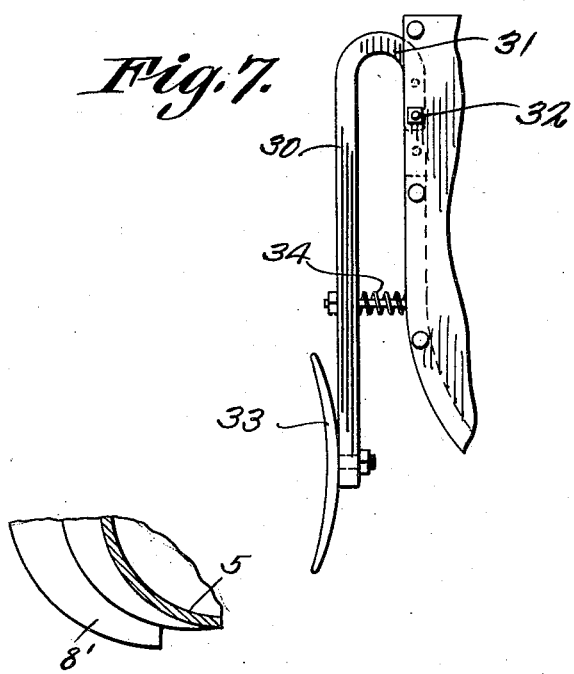
Clovis C. Lutz
Inventor
By C. A. Snow & Co.
Attorneys.

Patented Mar. 25, 1930

1,751,590

UNITED STATES PATENT OFFICE

CLOVIS C. LUTZ, OF CANTON, MISSISSIPPI

ATTACHMENT FOR PLANTERS

Application filed January 31, 1927. Serial No. 164,842.

This invention relates to an attachment for planters, the same being designed primarily for accurately placing a predetermined number of seed in a furrow in compact hills or clusters, said hills or clusters appearing at regularly recurring intervals, and permitting of adjustability as regards the number of seed allotted to each hill and the distance between hills, and causing seed to remain where so placed.

In planters heretofore constructed it has not been possible generally to accurately place as outlined the seeds because of the momentum imparted to the seeds while dropping to the ground and the momentum imparted thereto by the forward movement of the machine. Consequently the deposited seeds instead of being placed compactly in hills or clusters, have been scattered more or less with the result that the hills produced have been objectionably large, elongated, irregular, etc.

The present invention has for its object the provision of means whereby the momentum heretofore produced is counteracted with the result that the seeds will be accurately deposited compactly at the proper point in the furrow irrespective of conditions encountered in planting or of the operation of the dropping mechanism.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred forms of the invention have been shown.

In said drawings,

Figure 1 is a side elevation of a planter having the present improvements combined therewith.

Figure 2 is a vertical longitudinal section through the attachment constituting the present invention, a portion of the dropping mechanism of the planter being shown.

Figure 3 is a top plan view of the attachment.

Figure 4 is a section therethrough on line 4—4, Figure 2.

Figure 5 is a view similar to Figure 2 showing a modified form of attachment.

Figure 6 is a section on line 6—6, Figure 5.

Figure 7 is a side elevation showing another modified arrangement.

Figure 8 is an elevation of a portion of another slight modification.

Referring to the figures by characters of reference 1 designates a planter which can be of any preferred construction, the device, in the present instance, being provided with a seed container 2 having any suitable form of dropping mechanism indicated generally at 3. Ordinarily a boot is extended from this dropping mechanism for guiding the released seeds to the furrow. The attachment constituting the present invention is a furrow opening and seed receiving body designed to take the place of this boot and any valves that might be used in connection therewith. The said attachment includes a casing which, in the present instance, is formed of a front strip 4 having its lower portion curved downwardly and rearwardly as at 5 and a back strip 6, there being metal plates 7 attached to the sides of these strips 4 and 6. These plates are extended forwardly beyond the strip 4 and converge, the front edge portions being secured together and curved downwardly and rearwardly so as to constitute a furrow opener as shown at 8. The lower portion of the curved front edge of this furrow opener merges into the plane of the lower surface of the strip 5 as shown particularly in Figure 2. Thus the lower portion of strip 5 will ride as near the bottom of the furrow made by the curved front edge and bottom of the opener as it is possible and practicable for it to do so, in order that the seed being brushed off of this strip 5 (Fig. 2) will have no further to fall to the bottom of the furrow than the very small thickness of the said strip itself. This practically does away with all downward momentum of the seed, especially as this strip is made as thin as possible and the soft dirt presses upwardly as the bottom of the strip moves forward, thereby counteracting ever so small a fall. However, it must not be taken as contrary to the claims of the attachment or as departing from the spirit of the invention if the knife-like front edge only of the furrow opener is extended sharply downward below the strip 5 in order to cut stalks or litter from previous crops. Said extended part will cut but not open the furrow deeper than the level of the strip because it is nothing but a knife or sword and does not merge onto the plane of the lower surface of the strip 5. See Figure 8 wherein this knife has been shown at 8'. The lower end of strip 6 is above the level of the lower end of strip 4 and the side plates 7 are cut away along curved lines between the lower ends of the two strips so as to provide side clearances and visibility as shown at 9. Brackets 10, not claimed as part of this invention, are fastened to the side plates above the lower edges thereof and have runners 11 attached to them, these runners having upcurved forward ends as shown. The side plates 7 are offset laterally at the centers of their upper ends, as shown at 12, these offset portions being located close to and under or near the dropping mechanism so as to cooperate to provide a hopper-like portion for receiving the seeds as they are delivered by the dropping mechanism. The side plates 7 as well as the strips 4 and 6 can be attached to the frame of the planter in any manner desired so that said attachment will be held fixed relative to the planter frame. A transverse shaft 13 is journaled in the side plate, the curved portion 5 of the strip 4 being concentric with the shaft. Secured to and rotatable with the shaft is a wheel 14 to the periphery of which are attached arcuate strips 15 having angular wings 16 extending therefrom, each wing providing a radial portion 17 and an inclined or tangential advancing portion 18. These angular portions form wings adapted to wipe along the curved portions 5 of the strip 4 and also to come into contact with the strip 4 as the wheel rotates. A sprocket 19 can be secured to one end of the shaft for receiving motion through a chain 20 from a sprocket 21 rotating with one of the supporting wheels 22 of the planter. If desired, however, any other suitable mechanism may be employed for driving the wheel 14, it merely being necessary that the wheel be driven in the direction indicated by the arrow in Figure 2 and at a peripheral speed equal to the speed at which the machine travels along the ground. The means employed for driving the seed dropping mechanism constitutes no part of the present invention, it merely being essential that this mechanism be regulated to drop the desired number of seeds into the attachment.

As the machine moves forwardly the lower portion of the casing travels within the opened furrow. Seeds are dropped at regular intervals or in a more or less steady stream into the casing and fall upon the respective wings successively, each wing supporting a predetermined number of seeds. The wheel 14 revolves in the direction indicated by the arrow and carries the seeds downwardly and rearwardly until they are finally delivered off of the rear end of the curved portion 5 of strip 4 where they rest upon the bottom of the furrow in a compact cluster without being subjected to momentum due to the forward movement of the machine or to downward travel within a boot such as commonly employed. Consequently the resultant hills will be small and better results will be obtained than by the use of the dropping mechanisms such as heretofore employed.

If desired the distance between the hills or clusters of seeds can be regulated by providing the wheels with more or less paddles or by making the wheels with removable paddles or wings. By providing any suitable fastening devices not shown these paddles or wings can be placed equally distant around the circumference of the wings so as to give any desired spacing of the hills or clusters. Such an arrangement is so obvious that detailed illustration thereof is not deemed necessary.

Instead of utilizing a paddle construction such as illustrated in Figures 1 to 4 inclusive, the modified structure shown in Figures 5 and 6 can be employed. This includes a wheel 23 having radial paddles 24 designed to sweep the seeds from the curved portion 25 of the front strip 26 of the casing.

As shown in Figure 5 a furrow opener in the form of a shovel or blade 27 can be adjustably connected to the slotted front end 28 of a shoe 29 extending forwardly from the casing or, if preferred, a lever 30 having a crooked upper end 31 can be pivotally connected to the front of the casing as shown at 32 and extended downwardly, the lower end being provided with a blade or shovel 33. If preferred, instead of pivotally mounting lever 31 as shown, it could be made of spring steel and be a continuation of the strip 26 shown in Figure 5. A spring 34 can be interposed between the casing and the lever for holding the point pressed forwardly but allowing it to yield rearwardly under excessive resistance.

What is claimed is:

A seed depositing attachment for planters comprising a seed receiving body adapted to be secured beneath the seed container of a planter and comprising parallel side plates joined by narrow forward and rear walls, a rotatable wheel journaled between said plates with its rim closing the space between the plates and having radially extended wings thereon with one surface perpendicular to the rim and forming seed propelling abutments, the forward wall on the body having its lower portion curved on the arc described by the ends of the radially extended wings and contacting therewith, the curved portion of said wall terminating at the under side of the body as a runner-like bottom portion thereof normally resting on the soil when the attachment is in operation and ending there to form a seed outlet, the radial wings wiping the curved portion of said wall to sweep seeds from the end thereof horizontally onto the soil, the upper portions of the side plates being flared to provide an enlarged seed receiving channel immediately above the wheel.

In testimony that I claim the foregoing as my own, I have hereto affixed my signature.

CLOVIS C. LUTZ.